US010317622B2

(12) United States Patent
Ouyang et al.

(10) Patent No.: US 10,317,622 B2
(45) Date of Patent: Jun. 11, 2019

(54) RIGHT-ANGLE WAVEGUIDE HAVING CIRCULAR-CYLINDER-TYPE SQUARE-LATTICE PHOTONIC CRYSTAL AND SINGLE COMPENSATION SCATTERING CYLINDER HAVING LOW REFERENCE INDEX

(71) Applicant: SHENZHEN UNIVERSITY, Shenzhen, Guangdong (CN)

(72) Inventors: Zhengbiao Ouyang, Guangdong (CN); Hao Huang, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 45 days.

(21) Appl. No.: 15/515,594

(22) PCT Filed: Sep. 28, 2015

(86) PCT No.: PCT/CN2015/090877
§ 371 (c)(1),
(2) Date: Mar. 29, 2017

(87) PCT Pub. No.: WO2016/050181
PCT Pub. Date: Apr. 7, 2016

(65) Prior Publication Data
US 2017/0293077 A1    Oct. 12, 2017

(30) Foreign Application Priority Data

Sep. 29, 2014  (CN) .......................... 2014 1 0515261

(51) Int. Cl.
*G02B 6/122* (2006.01)
*G02B 6/125* (2006.01)
*G02B 6/126* (2006.01)

(52) U.S. Cl.
CPC .......... *G02B 6/1225* (2013.01); *G02B 6/125* (2013.01); *G02B 6/126* (2013.01)

(58) Field of Classification Search
CPC .... G02B 6/1225; G02B 6/1228; G02B 6/125; G02B 6/126
(Continued)

(56) References Cited

U.S. PATENT DOCUMENTS

| 6,674,949 B2 * | 1/2004 | Allan ..................... B82Y 20/00 385/129 |
| 2007/0172188 A1 * | 7/2007 | Noda ..................... B82Y 20/00 385/130 |

OTHER PUBLICATIONS

Borel et al. "Topology optimization and fabrication of photonic crystal structures", Opt. Express 12, 1996-2001 (2004).*

* cited by examiner

*Primary Examiner* — Michael P Mooney
(74) *Attorney, Agent, or Firm* — Zhihua Han

(57) ABSTRACT

A right-angle bending waveguide includes a circular-hole-type square-lattice photonic crystal (PhC) and a single compensation scattering rod having a low refractive index. The right-angle bending waveguide is a PhC formed from first dielectric rods having a low refractive index arranged in a background dielectric having a low refractive index according to a square lattice. In the PhC, one row and one column of the first dielectric rods having a high refractive index are removed to form the right-angle bending waveguide. A second dielectric rod having a high refractive index is arranged at a corner of the right-angle bending waveguide. The second dielectric rod is the compensation scattering rod or an air hole. The first dielectric rods are circular rods having the low refractive index or air holes. The right-angle bending waveguide having the circular-hole-type square-lattice PhC and the single compensation scattering rod having the low refractive index has extremely low reflec- (Continued)

tance and a very high transmission rate, facilitates large-scale optical path integration, and provides a broader space for PhC application.

17 Claims, 2 Drawing Sheets

(58) Field of Classification Search
USPC ..... 385/129–132, 11, 27, 31, 39, 43, 44, 48, 385/50
See application file for complete search history.

RIGHT-ANGLE WAVEGUIDE HAVING CIRCULAR-CYLINDER-TYPE SQUARE-LATTICE PHOTONIC CRYSTAL AND SINGLE COMPENSATION SCATTERING CYLINDER HAVING LOW REFERENCE INDEX

CROSS-REFERENCE TO RELATED APPLICATIONS

This application is a National Application of PCT/CN2015/090877, filed on Sep. 28, 2015. The contents of PCT/CN2015/090877 are all hereby incorporated by reference.

TECHNICAL FIELD

The present disclosure is related to a right-angle waveguide having a circular-cylinder-type square-lattice photonic crystal (PhC) and a single compensation cylinder.

BACKGROUND

In 1987, E. Yablonovitch of Bell laboratory of the United States and S. John of Princeton University independently put forward the concept of photonic crystal (PhC) respectively in discussion about suppressions of spontaneous radiations and in discussion about localizations of photons. The PhC has a substance structure formed by periodically arranging dielectric materials in a space, and is usually an artificial crystal composed of two or more materials with different dielectric constants.

A PhC has strong and flexible control ability for the light propagation, and has high conduction efficiency for both of the linear transmission and sharp right-angle transmissions. If a line effect is introduced in the PhC architecture for creating a light-guiding channel, called a photonic crystal waveguide (PCW), the waveguide passed through this PhC architecture only has a small loss even at the corner of the right angle (90 degrees). The above mentioned PhC architecture is totally different from the traditional basic optical waveguide having the completely internal reflection, and the effect of the defect-type waveguide is adapted for guiding the photon within the photonic band gap (PBG) to form a new state, and the density of the new state of photon adjacent to transmission mode in the defect-type waveguide is zero. Therefore, the defect-type waveguide is used as a PCW to achieve the transmission mode without the leakage of light, and the PCW is the basic device to form a photonic integrated circuit. The right-angle PCW is improve the integration of optical circuit, so the associated research with respect to the right-angle PCW is very important.

SUMMARY

The disclosure is advantageous in that it provides a right-angle waveguide having a circular-cylinder-type square-lattice PhC and a single compensation scattering rod, wherein the right-angle waveguide has an extremely low reflection and a very high transmission rate.

In order to achieve the above mentioned advantage, the foregoing and other objects and advantages are attained by the following design:

The right-angle waveguide having a circular-cylinder-type square-lattice photonic crystal (PhC) and a single compensation cylinder includes a plurality of first dielectric cylinders with low-refractive-index arranged in a dielectric background with high-refractive-index to form a PhC having a square lattice, and a right-angle waveguide formed by removing a row and a column of first dielectric cylinders with low-refractive-index; said right-angle waveguide further includes a corner, at least one second dielectric cylinder with low-refractive-index; the second dielectric cylinder with low-refractive-index arranged at corner position of the right-angle waveguide; and the second dielectric cylinder with low-refractive-index is displaced from the lattice point; the second dielectric cylinder with low-refractive-index is a compensation scattering cylinder, and has a radius of 0.39538, wherein a is one lattice constant of the square-lattice PhC, and has an angle of rotation of 124.722799 degree.

The first dielectric cylinders with low-refractive-index are circular cylinders, and are circular air cylinders.

The first dielectric cylinders with low-refractive-index are dielectric having a refractive index less than 1.6.

The first dielectric cylinders with low-refractive-index are air, vacuum, magnesium fluoride, or silicon dioxide, and are air.

The second dielectric cylinder with low-refractive-index dielectric is a compensation scattering air cylinder.

The second dielectric crystal with low-refractive-index is a semi-circular cylinder, a bow-shape cylinder, a circular cylinder, a triangular cylinder, a triangle cylinder, a polygon cylinder, or a cylinder having smooth closed curve cross-sectional contours; and the second dielectric cylinder with low-refractive-index is a semi-circular air cylinder.

The second dielectric cylinder with low-refractive-index is dielectric having a refractive index less than 1.6.

The second dielectric cylinder with low-refractive-index is air, vacuum, magnesium fluoride, or silicon dioxide, and is air.

The dielectric background with high-refractive-index having a different dielectric with refractive index of more than 2.

The dielectric background with high-refractive-index is silicon (Si), gallium arsenide, or titanium dioxide.

The dielectric background with high-refractive-index is Si, and has a refractive index is 3.4.

The right-angle waveguide is a transverse electromagnetic (TE) mode waveguide.

The area of the structure of the right-angle waveguide is equal or larger than 7a×7a, wherein a is the lattice constant of the square-lattice PhC.

The PhC optical waveguide device of the present disclosure is widely applied to various integrated photonic devices. Compared with the prior art, it has the following positive effects.

1. The right-angle waveguide having circular-cylinder-type square-lattice PhC and single compensation cylinder has a very low reflection and a very high transmission index, which provides a better application for photonic crystals (PhCs);

2. The structure of the present disclosure is based on the multiple scattering theory, wherein the light waves transmitted through the single compensation scattering cylinder is able to achieve the compensation for the phase and amplitude, so as to reduce the reflection index, and enhance the transmission index;

3. The right-angle waveguide having circular-cylinder-type square-lattice PhC and single compensation cylinder is based on a square-lattice structure, which is used for large-scale integrated optical circuit designs, wherein the optical circuit of the present disclosure is simple and easy to be designed, so as to apply to large-scale optical integration devices;

4. The right-angle waveguide having circular-cylinder-type square-lattice PhC and single compensation cylinder is based on a square-lattice structure, so that different light circuits and different optical elements are easy to be connected and coupled with each other, and the cost thereof is efficiently reduced.

Still further objects and advantages will become apparent from a consideration of the ensuing description and drawings.

These and other objectives, features, and advantages of the present disclosure will become apparent from the following detailed description, the accompanying drawings, and the appended claims.

DETAILED DESCRIPTION OF THE DRAWINGS

DETAILED DESCRIPTION

The following description is disclosed to enable any person skilled in the art to make and use the present disclosure. Some embodiments are provided in the following description only as examples and modifications will be apparent to those skilled in the art. The general principles defined in the following description would be applied to other embodiments, alternatives, modifications, equivalents, and applications without departing from the spirit and scope of the present disclosure.

Figure 1:
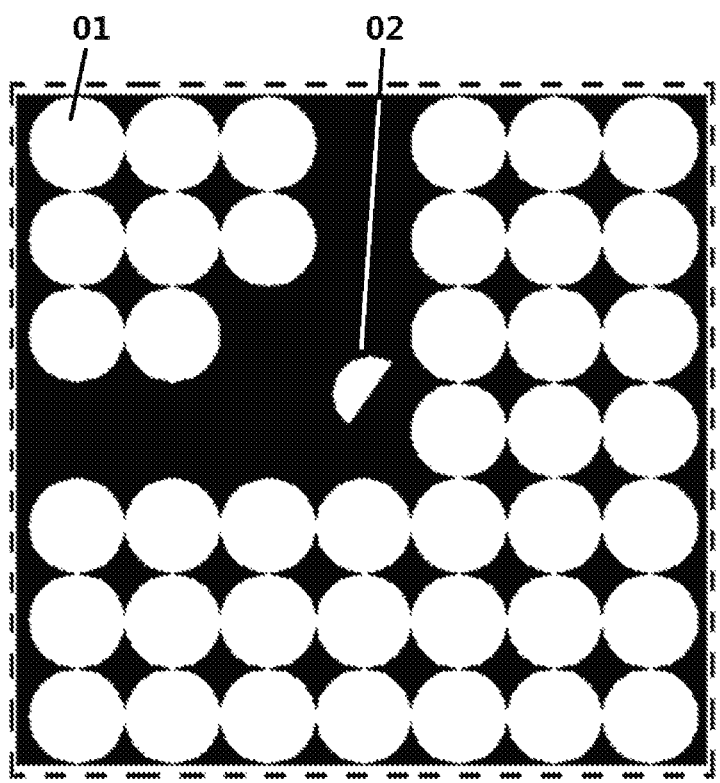
FIG. 1 is a core region of a circular-cylinder type square-lattice photonic crystal (PhC) and a single compensation scattering right-angle waveguide.

Referring to FIG. 1 of the drawings, a right-angle waveguide having a circular-cylinder-type square-lattice PhC and a single compensation scattering cylinder, wherein the right-angle waveguide includes a plurality of first dielectric cylinders 01 with a low refractive index arranged in a dielectric background with high-refractive-index to form a PhC having a square lattice, and a right-angle waveguide formed by removing a row and a column of first dielectric cylinders 01 with low-refractive-index; the right-angle waveguide further includes a corner, at least one second dielectric cylinder 02 with low-refractive-index, the second dielectric cylinder 02 with low-refractive-index arranged at corner position of the right-angle waveguide, and the second dielectric cylinder 02 with low-refractive-index is displaced from the lattice point; the second dielectric cylinder 02 with low-refractive-index is a compensation scattering cylinder, and the second dielectric cylinder 02 with low-refractive-index is a compensation scattering air cylinder (a compensation scattering air hole), the second dielectric cylinder 02 with low-refractive-index generate compensation reflection waves for offsetting with reflective waves from the right-angle waveguide; the second dielectric cylinder 02 (compensation scattering cylinder) with low-refractive-index has a variety of shapes, such as semi-circular cylinder (semi-circular hole), bow-shape cylinder (bow-shape hole), circular cylinder (circular hole), triangular cylinder (triangular hole), triangle cylinder (triangle hole), polygon cylinder (polygon hole), or cylinder (hole) having smooth closed curve cross-sectional contours; The dielectric background with high-refractive-index having a different dielectric with refractive index of more than two, and is silicon (Si), gallium arsenide, or titanium dioxide. The first dielectric cylinders with low-refractive-index are circular cylinders, the first dielectric cylinders 01 with low-refractive-index are dielectric having a refractive index less than 1.6, and are used as air, vacuum, magnesium fluoride, or silicon dioxide; as a step further, the first dielectric cylinders 01 with low-refractive-index are air. second dielectric cylinder 02 with low-refractive-index is dielectric having a refractive index less than 1.6, and are used as air, vacuum, magnesium fluoride, or silicon dioxide; as a step further, the second dielectric cylinder 02 with low-refractive-index are air.

Figure 2:
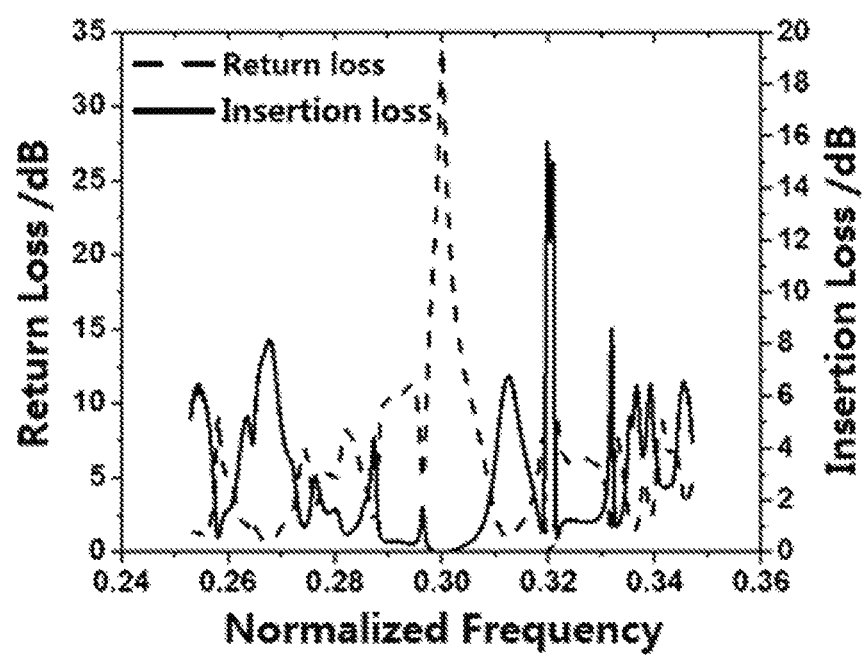
FIG. 2 is a diagram of transmission characteristic vs normalized frequency for the circular-cylinder square-lattice PhC and a single compensation scattering right-angle waveguide.

Some embodiments are shown below in accordance with the above result:

In at least one embodiment 1, the lattice constant of the square-lattice photonic crystal (PhC) is a, a first dielectric cylinder 01 with low-refractive-index is a circular cylinder (circular air cylinder or circular air hole), and a radius of the first dielectric cylinder 01 with low-refractive-index is 0.495a; light waves transmitted within the waveguide transverse electromagnetic (TE) waves; the compensation scattering cylinder is air cylinder (scattered air hole), so the second dielectric cylinder 02 with low-refractive-index is an air cylinder (air hole), and is a semi-circular air cylinder; The second dielectric cylinder 02 with low-refractive-index having a radius of 0.39538a; the coordinate of the second dielectric cylinder 02 with low-refractive-index is defined by the displacement from the origin to X and Z-direction at distance of 0.18961a and 0.82705a respectively (the origin is defined as the first lattice point from the right-hand side of the X-direction waveguide inside the waveguide corner), and the angle of rotation is 124.722799 degrees (the angle of rotation is defined as 0 for the case when the arc of the semicircle is up over the bowstring of the semicircle and bowstring is along the X-direction); the light source is located at a coordinate of (−5.3a, 0) having a displacement according to X direction and the Z-direction respectively; an initial phase of an incident light is 160 degree for the second dielectric cylinder 02 with low-refractive-index. The dielectric background with high-refractive-index is Si, and the refractive index of Si is 3.4; The first dielectric cylinders 01 with low-refractive-index are air. The area of the structure of the PhC having the right-angle waveguide is 15a×15a, and a return loss spectrum and an insertion loss spectrum of the PhC having right-angle waveguides are shown in FIG. 2. As shown in FIG. 2, a horizontal axis of the spectrum is defined as working frequency, and the vertical axis of the spectrum is defined as transmission, wherein dotted lines are shown as the return loss (defined as $L_R = -10 \log (P_R/P_I)$, and solid lines are shown as the insertion loss (defined as $L_T = -10 \log (P_T/P_I)$, wherein $P_I$ is the incident power, $P_R$ is the refractive power, and $P_T$ is the transmission power. The highest value of the normalized frequency is 0.3($\omega a/2\pi c$), and at the same time, the maximum value of the return loss and the insertion loss for the right-angle waveguide of the PhC is 34.07 dB and 0.0016 dB respectively.

In at least one embodiment 2, the lattice constant a of the square-lattice photonic crystal (PhC) is 0.465 μm; so the optimum normalized wavelength is 1.542 μm; the first dielectric cylinders 01 with low-refractive-index are circular cylinders, and the first dielectric cylinder 01 with low-refractive-index is a circular air cylinder (circular air hole), and a radius of the first dielectric cylinder 01 with low-refractive-index is 0.230175 μm; light waves transmitted within the waveguide transverse electromagnetic (TE) waves; the second dielectric cylinder 02 with low-refractiveindex is a semi-circular air cylinder (semi-circular air hole) having a radius of 0.183855 µm; the coordinate of the second dielectric cylinder 02 with low-refractive-index is defined by the displacement from the origin to X and Z-direction at distance of 0.088169 µm and 0.384581 µm respectively, and the angle of rotation is 124.722799 degree for the second dielectric cylinder 02 with low-refractive-index; the light source is located at a coordinate of (−2.4645 µm, 0) having a displacement according to X direction and the Z-direction respectively; the initial phase of the incident light is 160 degree. The dielectric background is Si, and the refractive index of Si is 3.4. the first dielectric cylinders 01 with low-refractive-index are air. The area of the structure of the PhC having right-angle waveguide is 15a×15a, and the maximum value of the return loss and the insertion loss for the right-angle waveguide of the PhC is 20.542796 dB and 0.038303 dB respectively.

In at least one embodiment 3, the lattice constant a of the square-lattice photonic crystal (PhC) is 0.465 µm, so the optimum normalized wavelength is 1.55 µm; the first dielectric cylinders 01 with low-refractive-index are circular cylinders, and the first dielectric cylinder 01 with low-refractive-index cylinder (circular air hole), and a radius of the first dielectric cylinder 01 with low-refractive-index is 0.230175 µm; light waves transmitted within the waveguide transverse electromagnetic (TE) waves; the second dielectric cylinder 02 with low-refractive-index is a semi-circular air cylinder (semi-circular air hole) having a radius of 0.183855 µm; the coordinate of the second dielectric cylinder 02 with low-refractive-index is defined by displacing from the origin to X and Z-direction at distance of 0.088169 µm and 0.384581 µm respectively, and the angle of rotation is 124.722799 degrees degree for the second dielectric cylinder 02 with low-refractive-index; the light source is located at a coordinate of (−2.4645 µm, 0) having a displacement according to X direction and the Z-direction respectively; an phase angle of an incident light is 160 degrees degree. The high refractive index second dielectric background is silicon (Si) having a refractive index of 3.4 The dielectric background with high-refractive-index is Si, and the refractive index of Si is 3.4; the low refractive index dielectric is air the first dielectric cylinders 01 with low-refractive-index are air. The area of the structure of the PhC having rectangular right-angle waveguide is 15a×15a, and the maximum value of the return loss and the insertion loss for the right-angle bending waveguide of the PhC is 34.07 dB and 0.0016 dB respectively.

In at least one embodiment 4, the lattice constant a of the square-lattice photonic crystal (PhC) is 0.3 µm, so the optimum normalized wavelength is 1.00 µm; the first dielectric cylinder 01 with low-refractive-index is a circular cylinder (circular air hole), and a radius of the first dielectric cylinder 01 with low-refractive-index is 0.1485 µm; light waves transmitted within the waveguide transverse electromagnetic (TE) waves; the second dielectric cylinder 02 with low-refractive-index is a semi-circular air cylinder (semi-circular air hole) having a radius of 0.118614 µm; the coordinate of the second dielectric cylinder 02 with low-refractive-index is defined by the displacement from the origin to X and Z-direction at distance of 0.056883 µm and 0.248115 µm respectively, and the angle of rotation is 124.722799 degree for the second dielectric cylinder 02 with low-refractive-index; the light source is located at a coordinate of (−1.59 µm, 0) having a displacement according to X direction and the Z-direction respectively; an initial phase of an incident light is 160 degree. The dielectric background with high-refractive-index is Si, and the refractive index of Si is 3.4; the first dielectric cylinders 01 with low-refractive-index are air. The area of the structure of the PhC having the right-angle waveguide is 15a×15a, and the maximum value of the return loss and the insertion loss for the right-angle waveguide in the PhC is 34.07 dB and 0.0016 dB respectively.

In at least one embodiment 5, the lattice constant a of the square-lattice photonic crystal (PhC) is 0.444 µm, so the optimum normalized wavelength is 1.48 µm; a first dielectric cylinder 01 with low-refractive-index is a circular air cylinder (circular air hole), and a radius of the first dielectric cylinder 01 with low-refractive-index is 0.21978 µm; light waves transmitted within the waveguide transverse electromagnetic (TE) waves; the second dielectric cylinder 02 with low-refractive-index is a semi-circular air cylinder (semi-circular air hole) having a radius of 0.175549 µm; the coordinate of the second dielectric cylinder 02 with low-refractive-index is defined by the displacement from the origin to X and Z-direction at distance of 0.084187 µm and 0.36721 µm respectively, and the angle of rotation is 124.722799 degree for the second dielectric cylinder 02 with low-refractive-index; the light source is located at a coordinate of (−2.3532 µm, 0) having a displacement according to X direction and the Z-direction respectively; an initial phase of an incident light is 160 degree. The dielectric background with high-refractive-index is Si, and the refractive index of Si is 3.4; the first dielectric cylinders 01 with low-refractive-index are air. The area of the structure of the PhC having the right-angle waveguide is 15a×15a, and the maximum value of the return loss and the insertion loss for the right-angle waveguide of the PhC is 34.07 dB and 0.0016 dB respectively.

In at least one embodiment 6, the lattice constant a of the square-lattice photonic crystal (PhC) is 150 µm, so the optimum normalized wavelength is 500 µm; the first dielectric cylinder 01 with low-refractive-index is a circular air cylinder (circular air hole), and a radius of the first dielectric cylinder 01 with low-refractive-index is 74.25 µm; light waves transmitted within the waveguide transverse electromagnetic (TE) waves; the second dielectric cylinder 02 with low-refractive-index is a semi-circular air cylinder (a semi-circular air hole) having a radius of 59.307 µm; the coordinate of the second dielectric cylinder 02 with low-refractive-index is defined by the displacement from the origin to X and Z-direction at distance of 28.4415 µm and 124.0575 µm respectively, and the angle of rotation is 124.722799 degree for the second dielectric cylinder 02 with low-refractive-index; the light source is located at a coordinate of (−795 µm, 0) having a displacement according to X direction and the Z-direction respectively; the initial phase of the incident light is 160 degree. The dielectric background with high-refractive-index is Si, and the refractive index of Si is 3.4; the first dielectric cylinders 01 with low-refractive-index are air. The area of the structure of the PhC having the right-angle waveguide is 15a×15a, and the maximum value of the return loss and the insertion loss for the right-angle waveguide of the PhC is 34.07 dB and 0.0016 dB respectively.

One skilled in the art will understand that the embodiment of the present disclosure as shown in the drawings and described above is exemplary only and not intended to be limiting.

It will thus be seen that the objects of the present disclosure have been fully and effectively accomplished. The embodiments have been shown and described for the purposes of illustrating the functional and structural principles of the present disclosure and is subject to change without departure from such principles. Therefore, this disclosure includes all modifications encompassed within the spirit and scope of the following claims.

What is claimed is:

1. A right-angle waveguide having a circular-cylinder-type square-lattice photonic crystal (PhC) and a single compensation cylinder having low-refractive-index, comprising:
   a plurality of first dielectric cylinders with low-refractive-index arranged in a dielectric background with high-refractive-index to form a PhC having a square lattice, and a right-angle waveguide formed by removing a row and a column of first dielectric cylinders with low-refractive-index; said right-angle waveguide further comprises:
   a corner, at least one second dielectric cylinder with low-refractive-index; said second dielectric cylinder with low-refractive-index arranged at corner position of the right-angle waveguide; and said second dielectric cylinder with low-refractive-index is displaced from the lattice point; said second dielectric cylinder with low-refractive-index is a compensation scattering cylinder, and has a radius of 0.39538a, wherein a is one lattice constant of the square-lattice PhC, and has an angle of rotation of 124.722799 degree.

2. The right-angle waveguide of claim 1, wherein said first dielectric cylinders with low-refractive-index are circular cylinders.

3. The right-angle waveguide of claim 2, wherein said first dielectric cylinders with low-refractive-index are circular air cylinders.

4. The right-angle waveguide of claim 1, wherein said first dielectric cylinders with low-refractive-index are dielectric having a refractive index less than 1.6.

5. The right-angle waveguide of claim 1, wherein said first dielectric cylinders with low-refractive-index are air, vacuum, magnesium fluoride, or silicon dioxide.

6. The right-angle waveguide of claim 5, wherein said first dielectric cylinders with low-refractive-index are air.

7. The right-angle waveguide of claim 1, wherein said second dielectric cylinder with low-refractive-index dielectric is a compensation scattering air cylinder.

8. The right-angle waveguide of claim 1, wherein said second dielectric crystal with low-refractive-index is a semi-circular cylinder, a bow-shape cylinder, a circular cylinder, a triangular cylinder, a triangle cylinder, a polygon cylinder, or a cylinder having smooth closed curve cross-sectional contours.

9. The right-angle waveguide of claim 8, wherein said second dielectric cylinder with low-refractive-index is a semi-circular air cylinder.

10. The right-angle waveguide of claim 1, wherein said second dielectric cylinder with low-refractive-index is dielectric having a refractive index less than 1.6.

11. The right-angle waveguide of claim 1, wherein said second dielectric cylinder with low-refractive-index is air, vacuum, magnesium fluoride, or silicon dioxide.

12. The right-angle waveguide of claim 11, wherein said second dielectric cylinder with low-refractive-index is air.

13. The right-angle waveguide of claim 1, wherein said dielectric background with high-refractive-index having a different dielectric with refractive index of more than 2.

14. The right-angle waveguide of claim 1, wherein said dielectric background with high-refractive-index is silicon (Si), gallium arsenide, or titanium dioxide.

15. The right-angle waveguide of claim 14, wherein said dielectric background with high-refractive-index is Si, and has a refractive index is 3.4.

16. The right-angle waveguide of claim 1, wherein said right-angle waveguide is a transverse electromagnetic (TE) mode waveguide.

17. The right-angle waveguide of claim 1, wherein area of structure of said right-angle waveguide is equal or larger than 7a×7a, wherein a is one lattice constant of the square-lattice PhC.

* * * * *